United States Patent [19]

Ollinger et al.

[11] 3,798,549

[45] Mar. 19, 1974

[54] APPARATUS FOR TRANSMITTING DATA OVER RADIO CONNECTIONS

[75] Inventors: Max Ollinger; Wernhard Markwitz, both of Munich; Dieter Niethammer, Unterhaching; Oddvar Kvale, Sagdalsveien, all of Germany

[73] Assignee: Siemens Aktiengesellschaft, Berlin & Munich, Germany

[22] Filed: Apr. 13, 1972

[21] Appl. No.: 243,586

[30] Foreign Application Priority Data

Apr. 21, 1971 Germany .......................... 2119489

[52] U.S. Cl. .................. 325/322, 178/2 C, 178/4.1, 178/69.6, 325/466, 340/146.1 BA, 340/159

[51] Int. Cl. ............................................. H04l 3/02

[58] Field of Search ........... 325/321, 322, 325, 302, 325/466; 178/69.5 R, 2 C, 4.1 R, 69.6; 179/15 BS, 15 BY; 343/228; 235/92 CT, 92 MS, 92 SA; 340/146.1 BA, 158, 159

[56] References Cited

UNITED STATES PATENTS

| | | | |
|---|---|---|---|
| 3,694,757 | 9/1972 | Hanna | 325/325 |
| 3,597,547 | 8/1971 | Roll | 179/15 BS |
| 3,696,210 | 10/1972 | Peterson | 325/322 |
| 3,375,327 | 3/1968 | Hertog | 325/325 |
| 2,812,509 | 11/1957 | Phelps | 343/228 |

*Primary Examiner*—Malcolm A. Morrison
*Assistant Examiner*—R. Stephen Dildine, Jr.

[57] ABSTRACT

Circuitry is described which facilitates data transmission over radio links by preventing receiver errors, even when call addresses are distorted. The incoming call addresses consisting of several characters are applied to transmission lines, one of which is assigned to each character. The latter character lines are connected to a character counter, over an output of which a call address signal is emitted when all characters of a given call address are received in proper succession. The call address is coupled to an address counter which emits a counter signal when it receives a certain number of call address signals within a prescribed time. By means of this counter signal, a switch is operated to effect the transmission of the received data from the receiver to the data terminal.

8 Claims, 7 Drawing Figures

APPARATUS FOR TRANSMITTING DATA OVER RADIO CONNECTIONS

BACKGROUND OF THE INVENTION

The invention relates to apparatus for transmitting data over radio connections using call addresses. The data is received by means of receivers and directed to data terminals. The call addresses consist of several characters, to which a character line is assigned. In particular, teleprinters, displays, and apparatuses which are controlled by means of the data can be provided as data terminals. Thus, recorders which are controlled by means of the data can also be provided.

With teleprinter-radio connections there is the problem of transmitting messages which are intended for different subscriber stations on the same channel. It is necessary that each subscriber station receives only the information intended for it. For this purpose the communications intended for the different subscriber stations are designated by call addresses, each having a sequence of differing characters.

A circuit arrangement known from West German Patent No. DAS 1,178,891 records only those messages received on a common radio channel, which messages are preceded by the call address assigned to this subscriber station. This known circuit arrangement includes character identification devices, which produce an identification signal upon reception of a prescribed telegraph pulse group and a character sequence recognition device, which is controlled by the character identification device and upon reception of a predetermined call address causes the communication to be recorded. The character sequence recognition device is comprised of a number of bistable stages which are interconnected such that each stage is placed in its operating state only when the preceding stage is in its operating state. The character sequence recognition device thus causes the communication to be recorded only if all identification characters which are recognized arrive in the prescribed order. Thereby different call addresses can be used for each subscriber station, of which one applies to only one subscriber station, of which a further one applies to a group of subscriber stations, and of which a third applies to all subscriber stations. The character sequence recognition device thus recognizes the sequential identification characters of the call address, but also responds when arbitrary other characters arrive between individual identification signals. In order to prevent mix-ups and faulty connections, every received character combination becomes invalid when the character "interval" is received. Although this character occurs relatively often, faulty transmissions are not precluded with certainty through this measure. A further disadvantage of this known circuit arrangement can be seen in that no precautions are taken in order to connect a subscriber station automatically even with a faulty transmission channel, and to transmit the appropriate message.

It is, therefore, an object of this invention to provide a means for enabling subscriber stations with characteristic call addresses to automatically receive data even if the transmitted call addresses arrive at the subscriber station partially garbled.

SUMMARY OF THE INVENTION

The aforementioned and other objects are achieved in an apparatus according to the invention wherein the character lines are connected to a character counter, over an ouput of which a call address signal is emitted, when all characters of a call address are received in direct sequence. This call address signal is directed to an address counter, which emits a counter signal when it receives a certain number of call address signals within a prescribed time. By means of this counter signal, a switch is controlled which effects the transmission of data from the receiver to the data teminal.

The arrangement according to the invention has the advantage that with its use the effects of permutations of call addresses are eliminated for all practical purposes. This is because the apparatus responds automatically to characters of the call address only when these characters are in direct sequence. In spite of this, the recognition of call addresses is ensured even with a faulty transmission channel, because the call addresses are transmitted more than once, in a sequence, but must be recognized within a prescribed time.

In a preferred example, the character counter is comprised of a logical circuit and a switch stage which has as many stable states as the call address contains characters, each character being assigned one of the stable states. Thereby the switch stage is placed in its stable states in succession, if the received characters arrive in the correct order, and if the characters and the stable states assigned to them do not agree, the character counter is reset to its starting state.

In order to take into account the noise level of the transmission channel, it is appropriate to connect the address counter with a chronometer, which effects the resetting of the address counter after an adjustable or controllable time.

In accordance with a further aspect of the invention, the aforementioned time period is a function of the noise level of the transmission channel. For example, signals of the same meaning can be selected from the received data, and from these selected signals a noise level reference signal can be derived, by means of which the time period of operation of the chronometer is established.

BRIEF DESCRIPTION OF THE DRAWINGS

The principles of the invention will be more readily understood by reference to a description of preferred embodiments, constructed according to those principles, given hereinbelow in conjunction with the drawings which are further identified below. In the drawings like reference numerals are used to denote like elements or signals.

DETAILED DESCRIPTION OF THE DRAWINGS

Figure 1:
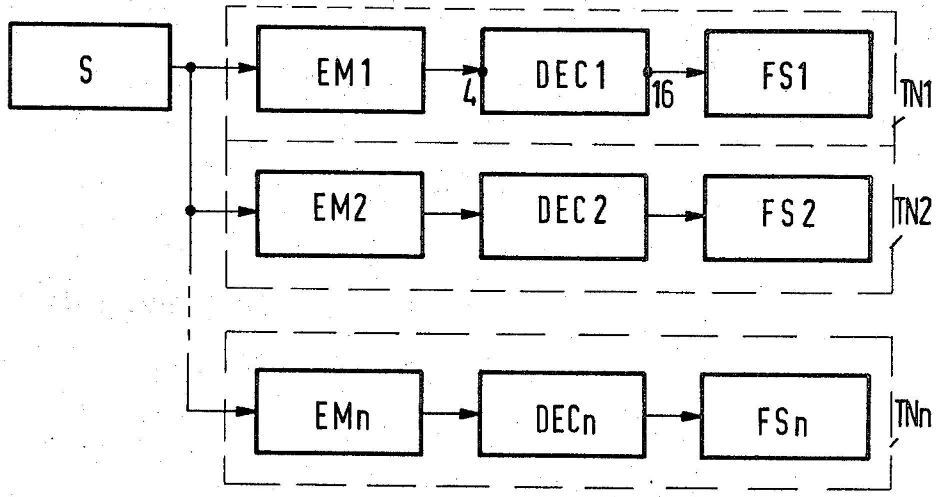
FIG. 1 shows a system of teleprinter-radio connections in a generalized schematic representation.

FIG. 1 shows schematically a radio connection system, wherein messages are transmitted from a transmitter S to receivers EM1, EM2, EM2, . . . , EM*n*. Decoders DEC1, DEC2 . . . DEC*n* are connected to these receivers, are set to a specific selective call address and are connected to the teleprinters FS1, FS2 . . . FS*n* as data terminals. The decoders DEC have the task of allowing only the message intended for the applicable subscriber station TN1, TN2, . . . TN*n*, to be forwarded to the teleprinter FS, there to be printed. This system arrangement is known in the art, as are those portions of the receivers and the teleprinters which are not described in greater detail hereinbelow.

Figure 2:
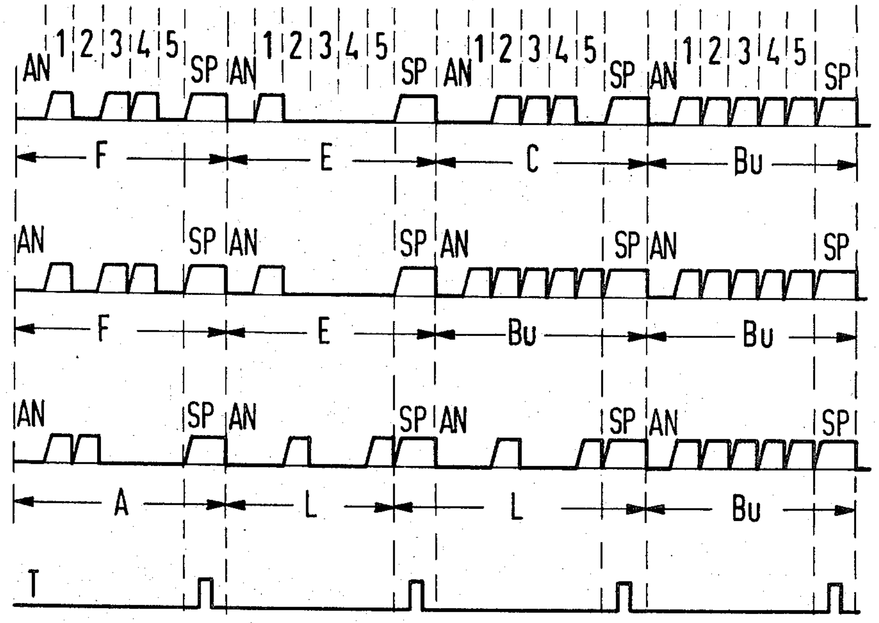
FIG. 2 is a diagram of teleprinter characters and call addresses.

FIG. 2 shows several teleprinter symbols, according to the teleprinter code CC1TT No. 2, which consist of a starting pulse AN, five pulse segments 1, 2, 3, 4, 5 and an ending pulse SP. In the top-most row, the letters F, E, C, Bu are represented as a call address for calling a single subscriber. The character Bu represents the change-over of letters. In the middle row the call address is shown with the characters F, E, Bu, Bu, which serves as a group call address for calling a group of subscribers. In the third row the call address A, L, L, Bu is shown, which serves as call address for calling everyone in the system. The lowermost row of pulses is a sequence of character pulses T, which occur during the ending pulse SP.

Figure 3:
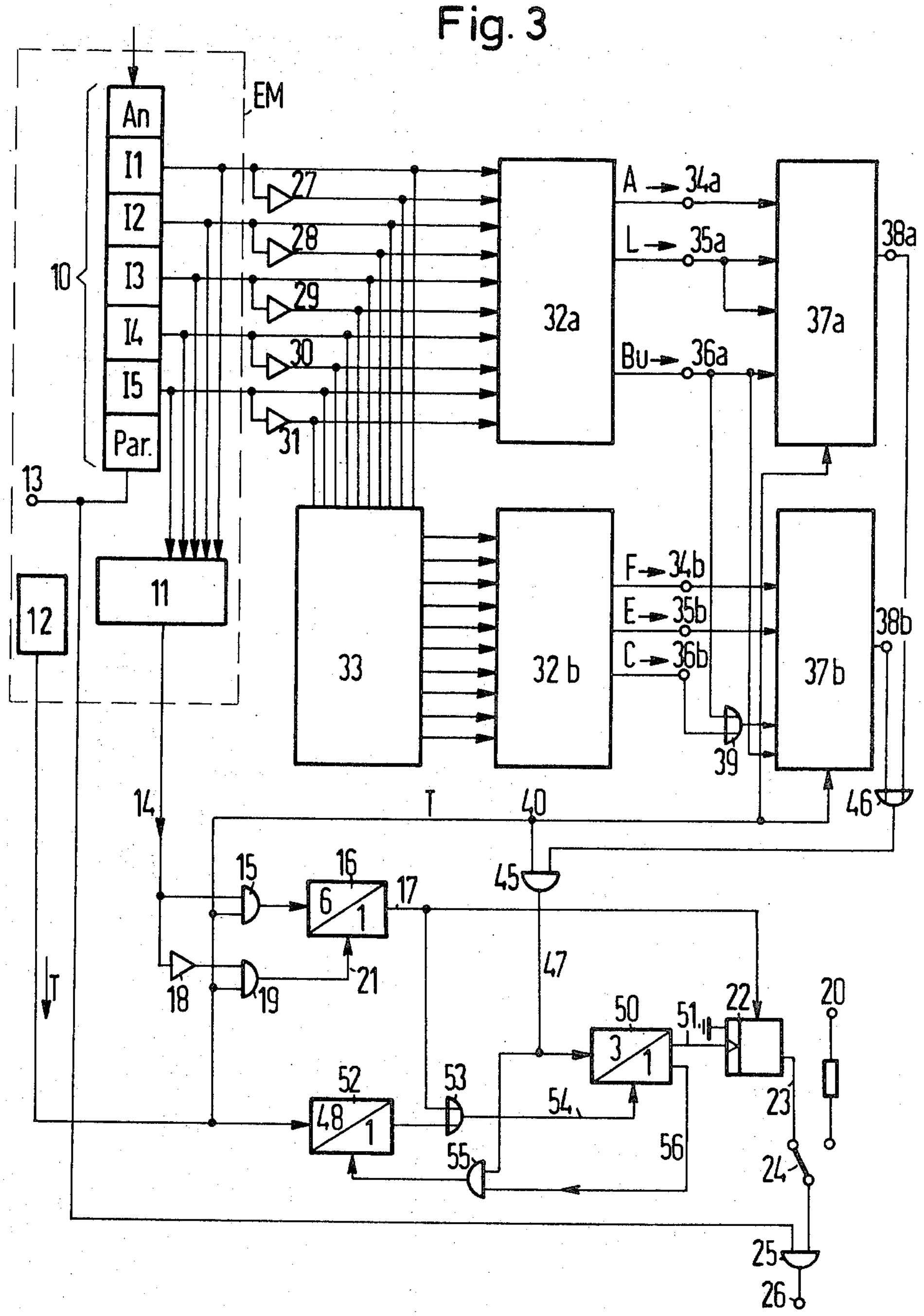
FIG. 3 is a schematic diagram of a decoding circuit for automatic recognition of call addresses.

FIG. 3 shows schematically and in greater detail a portion of a receiver EM and a decoder DEC.

Within the receiver EM a shift register 10 is provided, by means of which characters entering synchronously are forwarded asynchronously. The shift register 10 has seven slots, of which one slot is meant for the starting pulse AN, the five next slots I1, I2, I3, I4, I5 are meant for five pulse segments of a character and the last slot is meant for a parity character. Within the receiver EM a device 11, of conventional construction, is provided, which recognizes the call starting character. A pulse generator 12 emits the character pulse T. The teleprinter signals are directed over terminal 13 to the shift register 10. Thus, the pulse segments 1 to 5, corresponding to a character, are in slots I1 to I5, as shown, for example, in FIG. 2.

The slots I1 to I5 are connected to the code recognition device 11, which emits an output signal over the line 14 only when the call starting character is stored in register 10. Since the character "carriage return" is used as call starting character, an output signal is emitted over the line 14 only when the character "carriage return" is in register 10. By using an AND gate 15, a counter 16 is advanced upon arrival of the next pulse T. This counter 16 emits an output signal over line 17, when six call starting characters have been received. By using an inverter 18 and an AND gate 19, a signal for resetting the counter 16 is emitted over line 21, when no call starting character is received over line 14. Thus, a signal is emitted over the line 17 only when at least six call starting characters are received in uninterrupted sequence in receiver EM.

By means of the signal which is emitted over the line 17, an bistable switching stage 22 in a first of its two bistable states, whereby it emits a 0-signal to the AND gate 25 over line 23 and over switch 24, whereby the conductive connection of the terminals 13 and 26 is interrupted. Since a teleprinter FS (not shown) is connected over the terminal 26, by means of the signal emitted over the line 17, it is caused that at the beginning of a message transmission all teleprinters are switched off. That prevents one of the teleprinters from printing messages which are not intended for the applicable subscriber station.

The slots I1, I2, I3, I4, I5 are directly connected to the circuit 32a and 33 (to be described in greater detail hereinbelow), and on the other hand over the inverters 27, 28, 29, 30, 31. The circuit 32*a* emits signals to a character counter 37*a* over the lines 34*a*, 35*a* or 36*a*, which are assigned to the characters A, L or Bu respectively. These signals can assume one of two values, which in the following are designated as a 0-signal and a 1-signal. If, for example, the pause steps and the current steps corresponding to the character A are stored in register 10, then a 1-signal is emitted to the character counter 37a over the line 34a. A signal is emitted over the output 38a, when the characters A, L, L, B*u* are received in proper time sequence.

By use of a switching field 33, the setting of the single-call address provided for a certain subscriber is effected. The outputs of the switching field 33 are connected to a circuit 32*b*, which emits signals over the lines 34*b*, 35*b*, 36*b*, which are assigned to the characters of the single-call address. By means of the switching field 33, other single-call addresses can be set, as well.

The character counter 37*b* is built like the character counter 37*a*. The switching points 34*b* and 35*b* are connected directly to the character counter 37*b*, whereas the switching point 36*b* is connected to the counter 37*b* over an OR gate 39. Thus, single call addresses of the form F, E, C, B*u* are coupled to the character counter 37*b*. In addition, because of the OR element 39, also group call addresses of the form F, E, B*u*, B*u* are directed thereto. A signal is emitted over the output 38*b*, when either a single call address of a group call address has been completely received.

When the AND gate 45 receives a 1-signal from OR gate 46 and over a connection point 40, then a 1-signal is emitted to an address counter 50 over the line 47. This address counter 50 emits a signal to the bistable stage 22 over the line 51, if it receives three 1-signals over the line 47 within a certain time. Thus, when three call addresses have been correctly received within this certain time, the bistable stage 22 is switched into the 1-state. Then, a 1-signal is emitted over the line 23, through which AND gate 25 becomes conductive upon arrival of a message, and the data transmitted over the terminal 13 are forwarded to the teleprinter (not shown) over the terminal 26.

The time, within which several call addresses must be correctly received, is established by use of a counter 52, which receives the character pulse T, and after reception of 48 signal pulses, emits an output signal to the address counter 50 over OR gate 53 and line 54, causing counter 50 to be reset. When during this time less than three call addresses and corresponding 1-signals are directed over the line 47, the teleprinter is not connected over the terminal 26. By use of AND gate 55, the counter is reset, if 1-signals enter over the lines 47 and 56. When the switch 24 is connected conductively with the switching point 20, then the automatic call recognition is switched off.

Figure 4:
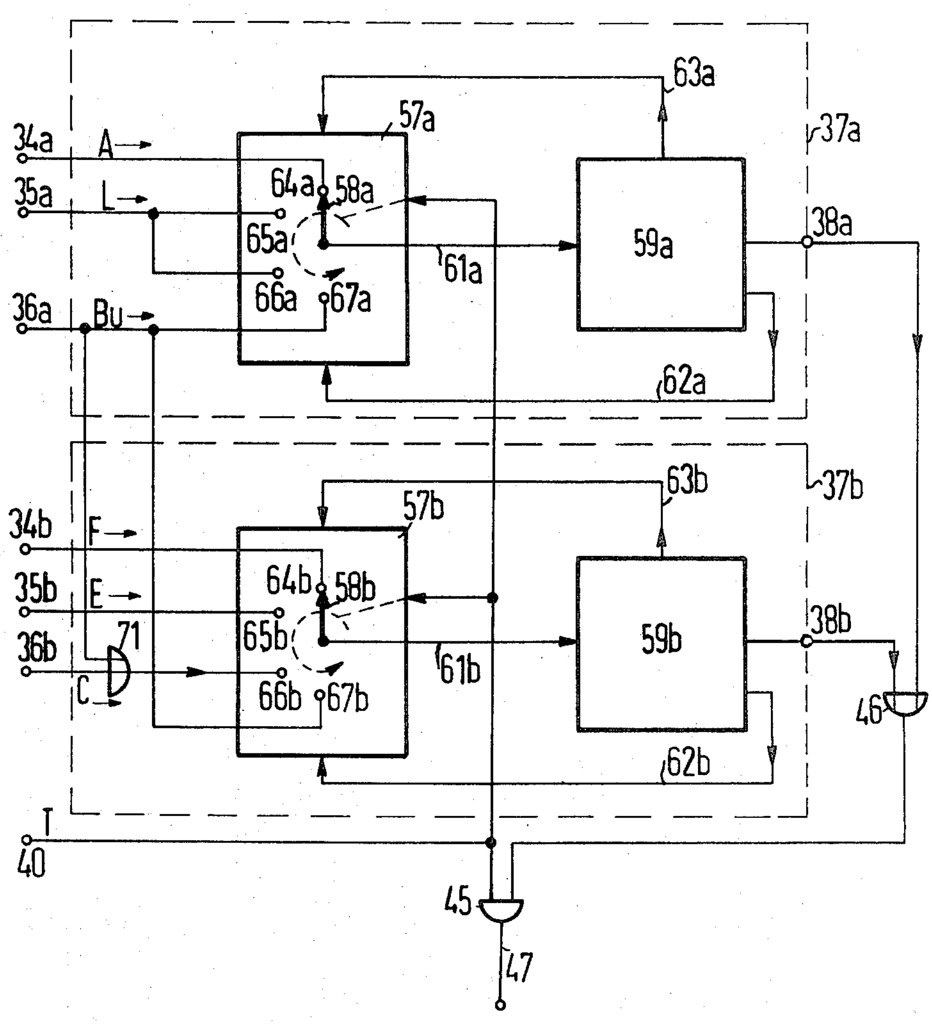
FIG. 4 is a more detailed schematic diagram of the character counter in the FIG. 3 embodiment.

FIG. 4 shows schematically structural details of the character counters 37*a* and 37*b*. The character counter 37*a* is comprised of a step switching stage **57*a* with a switching arm 58*a*, and of a logic circuit 59*a*. Switching stage 57*a*, is well as 57*b*, are shown as being electromechanical switches for explanatory purposes, but it will be realized that electronic devices of known construction can perform these functions. The switching arm 58*a* is supposed to symbolize one of the four stable states, which the switching stage 57*a* can assume. This switching stage 57*a* receives the character pulse T over the terminal 40, whereby the switching arm 58*a*, starting from contact 64*a*, is advanced in the direction of the contacts 65*a*, 66*a*, and 67*a*. If the switching points 34*a*, 35*a* or 36*a* carry 1-signals, then the line 61*a* also carries a 1-signal, if the switching arm 58*a* is directed at the one of the contacts 64*a*, 65*a*, 66*a* or 67*a* associated therewith. With the setting of the switching arm 58*a* as shown in the drawing, the line 61*a* carries a 1-signal, when a 1-signal is also brought over the switching point 34*a*. In this case the logic circuit 59 a causes the emission of a 1-signal over line 62*a*, whereby the switching arm 58*a* is advanced, and now is at contact 65*a*. If then a 1-signal is brought over the switching point 35*a*, by use of the logic circuit 59*a*, the switching arm 58*a* is advanced again. If, however, an 0-signal is carried in the switching point 35*a*, than a 1-signal is emitted over the line 63*a*, which effects the resetting of the switching arm 58*a* to the setting 64*a*. The switching arm 58*a* is thus advanced, starting from contact 64*a*, to contact 67*a*, with each pulse, only when the characters A, L, L, Bu are received in sequence without a gap. In this case a 1-signal is emitted over the output 38*a*.**

The character counter **37*b* operates exactly like the previously described character counter 37*a*, wherein the reference numerals 38*b*, 57*b*, 58*b*, 61*b*, 62*b*, 63*b*, 64, 65*b*, 66*b*, 67*b* correspond to the reference numerals 38*a*, 57*a*, 58*a*, 59*a*, 61*a*, 62*a*, 63*a*, 64*a*, 65*a*, 66*a*, 67*a*. A 1-signal is emitted over the output 38b** when either the characters of a single call address or the characters of a group call address are received in sequence without gaps.

Figure 5:
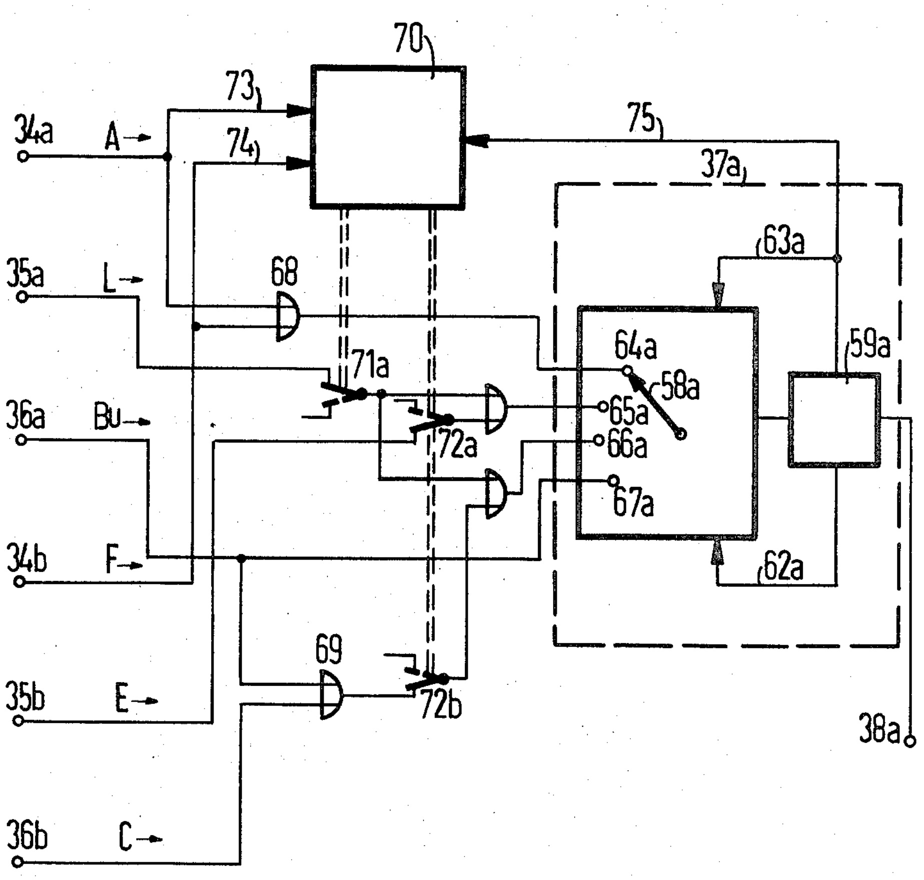
FIG. 5 is a schematic diagram of a further embodiment of the character counter in the FIG. 3 embodiment.

FIG. 5 shows schematically details of another version of the circuit arrangement shown in FIG. 4. This circuit shown in FIG. 5 has the advantage that in contrast to the circuit of FIG. 4, only a single character counter **37*a* is necessary. This is because with use of the control stage 70 and switches 71*a*, 72*a*, 72*b*, a change-over of the signals brought over the switching points 35*a*, 35*b*, 36*a*, 36*b* is effected. If, therefore, a collective call address of the form A, L, L, Bu (call to everyone) arrives over the terminals 34*a*, 35*a*, 36*a*, then by means of the line 73 and the control state 70, the switch is brought into the setting shown drawn in fully, so that the switching points 35*a*, 65*a*** are connected with each other. When a single call address (F, E, C, Bu) or group call address (F, E, B*u*, Bu) arrives over the terminals **34*b*, 35*b*, 36*b*, then, by means of the line and the control stage 70 the switches 72*a*, and 72*b* are switched into the position shown in full line, so that now the signals brought over the terminals 35*b*, 36*b* are conducted to the contacts 64*a* or 66*a*, respectively. Signals are emitted over output 38*a* of address counter 37*a*, when either four characters of a collective call address of four characters of a single call address or four characters of a group call address arrive in sequence without gaps at the terminals 34*a* to 36*a* or 34*b* to 36*b*. A signal is emitted over line 75 when the signals do not arrive in the correct order over terminals 34*a*, 35*a*, 36*a*, 34*b*, 35*b*, 36*b*. The control stage 70** is placed in the rest position with this signal, whereby the switches assume the shaded position.

Figure 6:
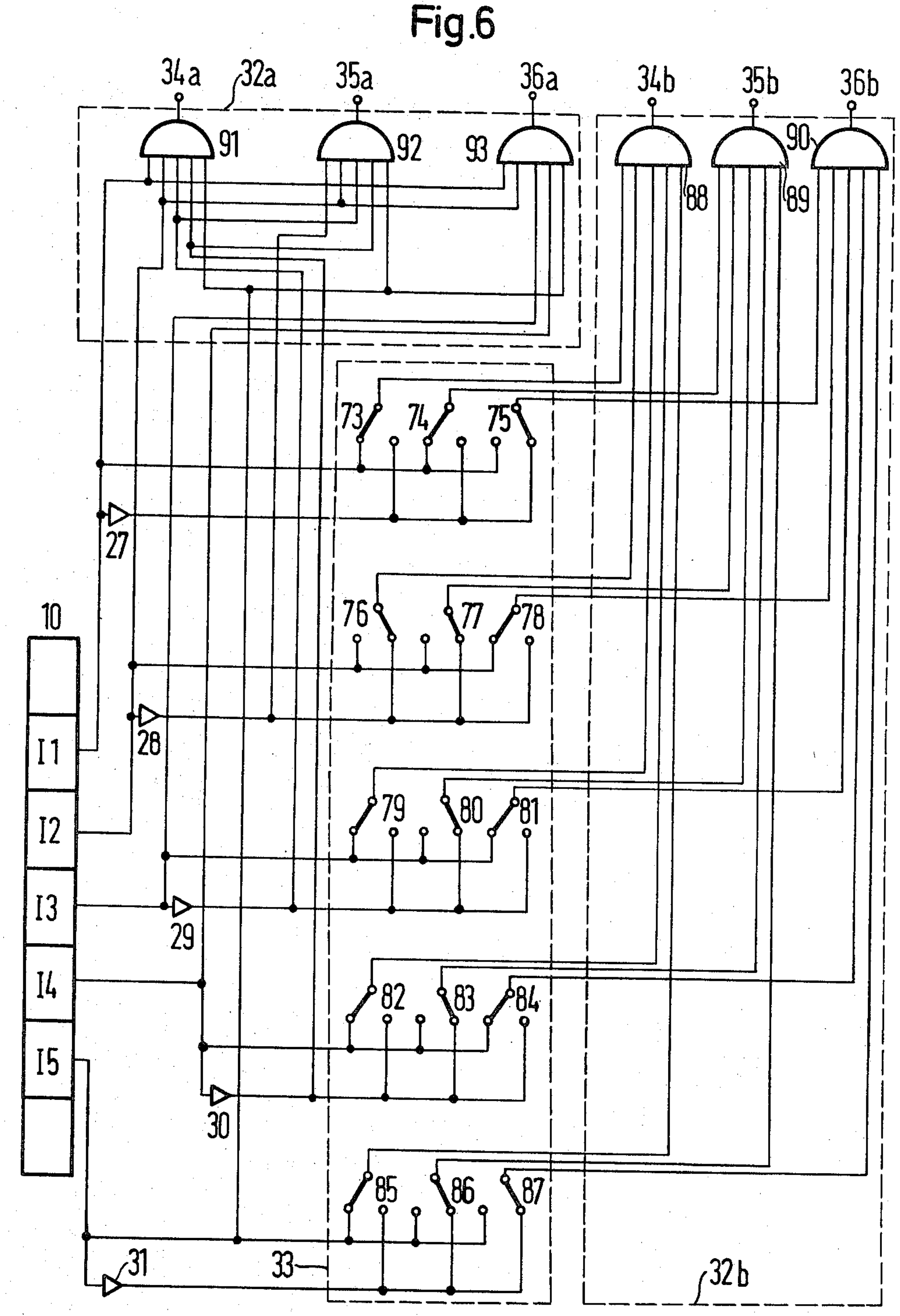
FIG. 6 is a schematic diagram of the circuits 32*a*, 32*b* and 33 of FIG. 3, illustrating them in greater detail.

FIG. 6 shows the switching field 33 and the circuit arrangements 32a and 32b in more detail than in FIG. 3. The switching field 33 comprises switches 73 to 87, which are brought into one of the two switching positions which are provided, corresponding to the desired call address of the subscriber station.

The outputs of the switching field 33 are connected directly to AND gates 88, 89, 90 of the circuit **32*b*. Thus, 1-signals are emitted over the switching points 34*b*, 35*b*, 36*b*, if the steps are stored in the slots of the register 10** which correspond to the characters of the special call address.

The slots of the register 10 are connected to the circuit **32*a*, in part directly and in part over the inverters 27 to 31. The circuit 32*a* is built essentially of the AND gates 91, 92, 93. The switching points 34*a*, 35*a*, 36*a* then carry 1-signals when characters of the collective call address are stored in register 10.**

Figure 7:
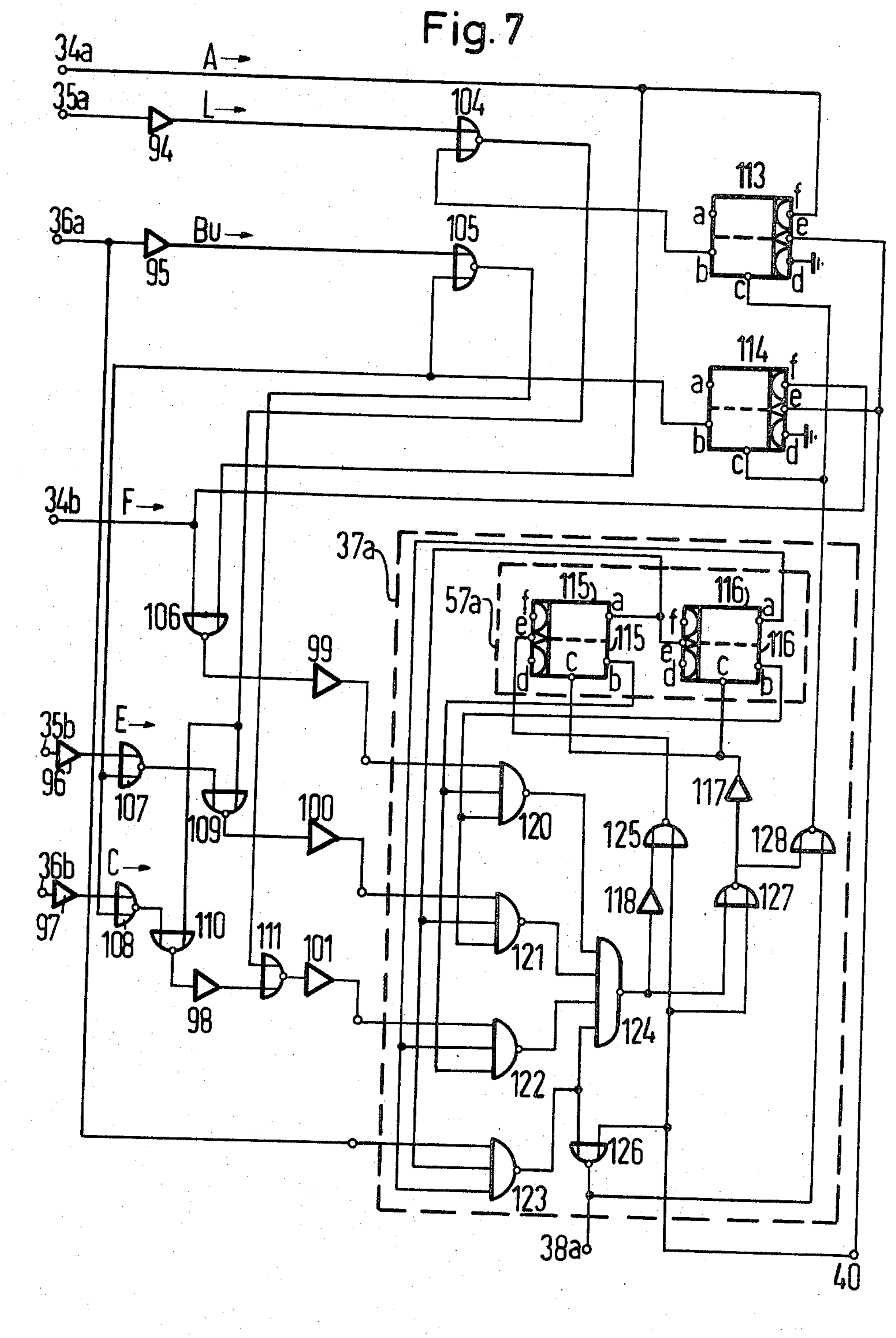
FIG. 7 is a more detailed schematic diagram of the switching stages 57 and 59, counter 37a and circuit 70 in FIGS. 4 and 5.

FIG. 7 shows details of the switching circuits **57*a* and 59*a* and counter 37*a* shown schematically in FIGS. 4 and 5. This circuit comprises inverters 94 to 101, the NOR elements 104 to 111, bistable switching stages 113, 114, and the address counter 37*a*. This address counter 37*a* is also shown in FIG. 7 in greater detail and comprises the switching stage 57*a*, which with the use of the flip-flops 115, 116 can assume a total of four stable states; in addition the address counter 37*a* comprises inverters 117, 118 and the NOR elements 125 to 127 and the NAND elements 120 to 124.**

The bistable switching stages 115 and 116 are connected in series and form a counting chain. These switching stages assume the 0-state when their terminals a and e carry a 0-signal and their terminals *b*, *c*, *d*, *f* carry a 1-state. In their 1-state the terminals b and e carry a 0-signal and the terminals *a*, *c*, *d*, *f* carry a 1-signal. These switching stages 115, 116 are shifted from their 1-state into the 0-state when a signal sequence 0 – 1 – 0 is emitted to terminal *e*. The switching stages are shifted from their 1-state into the 0-state when either the signal sequence 0 – 1 – 0 appears at terminal *e* or when the signal sequence 1 – 0 – 1 appears at terminal *c*.

The bistable switching stages 113, 114 assume their 0-state when the terminals *a*, *d*, *e*, *f* carry a 0-signal and the terminals *b* and *c* carry a 1-signal. In their 1-state, the terminals *b*, *d*, *e* carry a 0-signal and the terminals *a*, *c*, *f* carry a 1-signal. These switching stages 113 and 114 fulfill the function of the control stage 70 (FIG. 5). The NOR element corresponds to the switch **71*a*, the NOR element 107 corresponds to the switch 72*a* and the NOR elements 105 and 108 correspond to the switch 72*b* in FIG. 5**

The counter chain with the stages 115 and 116 assumes a total of four stable states 00, 10, 01, and 11. Each of these stable states of the counter chain is assigned to one of the signals which are conducted over the terminals **34*a* to 36*a* or 34*b* to 36*b*. Next it is assumed that the switching stages 115, 116 both assume the 0-state. When a 1-signal appears over terminal 34*a* (corresponding to the character A), then there results a 0-signal at the output of NOR element 106, a 1-signal at the output of the inverter 99, a 0-signal at the output of the NAND element 120, a 1-signal at the output of the NAND element 124, and a signal sequence 0 – 1 – 0 at the output of the NOR element 125, by means of which the stage 115 is switched into the 1-state. If two 1-signals are conducted in further sequence, one after another, over the terminals 35***a* (corresponding to two characters L), and a 1-signal (corresponding to the character Bu) is conducted over the terminal 36*a*, then the stages assume, in sequence, the states 00. 10, 01, 11, whereby a call address signal is emitted over terminal 38*a*, coincident with the assumption of the state 11. A like signal is also emitted when signals corresponding to the characters F, E, C, Bu arrive in time sequence over the switching points 34*b*, 35*b*, 36*b*, and 36*a*. If this order is not kept and signals corresponding to other characters arrive, then the stages 115, 116 are reset to their starting state 00.

The pulse generator 12 (FIG. 3) only delivers a signal pulse, when there is a printable character according to the teleprinter code No. 2. The counter stage 37*a* is advanced by means of the character pulse, and is not advanced when there is no character pulse. From that, it follows that during the pause between two successive characters there is no switching forward, even when a maintained separation signal corresponding to several successive current steps is given. The character counter 37*a* thus does not respond to these current steps corresponding to the maintained separation. This has the advantage that the individual characters of the call address can also be entered by hand.

The preferred embodiments of the invention described hereinabove are only exemplary. It is anticipated that modifications and changes thereto will occur to those skilled in the art which will be within the spirit and scope of the invention as defined by the appended claims.

What is claimed is:

1. Apparatus for receiving data transmissions from radio links including a receiver with the output of the receiver being coupled to a data terminal, said data including call addresses constituted by a plurality of characters, the apparatus being responsive to a predetermined call address, the apparatus comprising:

a plurality of character lines individually assigned to a character in said call address, first counter means connected to receive the outputs of said character lines for emitting a first signal when all characters of said call address are received in the predetermined succession, second counter means for receiving said first signal, for counting said first signals and for emitting a second signal upon counting a predetermined number of said first signals within a predetermined time period, and switch means, operative responsive to said second signal, for connecting said receiver to said data terminal.

2. The apparatus defined in claim 1 further comprising:

a pulse generator for producing character pulses and wherein said first counter comprises:

a switching stage having a number of stable states corresponding to the number of characters in said call address, said switching stage being switched to successive stable states responsive to said character pulses, said stable states corresponding to successive characters in said call address and logic circuit means for comparing the received character signals with the stable state reached by said switching stage for resetting said switching stage when the received character and stable state do not agree and for causing the next succeeding stable state to be switched in when there is agreement.

3. The apparatus defined in claim 2 wherein said switching stage comprises a series connection of bistable switching means.

4. The apparatus defined in claim 1 further comprising: time measuring means and wherein said second counter is connected to said time measuring means as to be reset thereby when said time measuring means has measured a predetermined time period.

5. The apparatus defined in claim 4 wherein said time measuring means is a counter operating responsive to said character signals and produces an output signal upon reaching a predetermined counting state.

6. The apparatus defined in claim 4 wherein said time measuring means includes means for adjusting the length of said predetermined time period responsive to the noise level on the radio transmission path.

7. The apparatus defined in claim 1 further comprising:

a shift register for receiving the call address characters from the receiver and having a number of register positions corresponding to the anticipated number of characters, first means for coupling said register positions individually to ones of said character lines and second means for coupling said register positions individually to further ones of said character lines.

8. The apparatus defined in claim 5 further comprising:

control means interposed between said first coupling means and said first counter means for switching the received call addresses to said first counter.

* * * * *